(12) United States Patent
Groenewolt

(10) Patent No.: US 9,017,818 B2
(45) Date of Patent: Apr. 28, 2015

(54) COATING COMPOSITIONS AND COATINGS PRODUCED FROM THEM AND FEATURING HIGH SCRATCH RESISTANCE IN ASSOCIATION WITH GOOD RESULTS IN THE ERICHSEN CUPPING TEST AND GOOD ANTISTONECHIP PROPERTIES

(75) Inventor: Matthijs Groenewolt, Münster (DE)

(73) Assignee: BASF Coatings GmbH, Munster (DE)

( * ) Notice: Subject to any disclaimer, the term of this patent is extended or adjusted under 35 U.S.C. 154(b) by 192 days.

(21) Appl. No.: 13/378,817

(22) PCT Filed: Mar. 8, 2010

(86) PCT No.: PCT/EP2010/001422
§ 371 (c)(1),
(2), (4) Date: Dec. 16, 2011

(87) PCT Pub. No.: WO2010/149236
PCT Pub. Date: Dec. 29, 2010

(65) Prior Publication Data
US 2012/0100380 A1    Apr. 26, 2012

(30) Foreign Application Priority Data

Jun. 24, 2009 (DE) .......................... 10 2009 030 481

(51) Int. Cl.
| | | |
|---|---|---|
| C09D 175/04 | (2006.01) | |
| B05D 1/38 | (2006.01) | |
| C08G 18/62 | (2006.01) | |
| C08G 18/77 | (2006.01) | |
| C08G 18/80 | (2006.01) | |

(52) U.S. Cl.
CPC ........ *C08G 18/6229* (2013.01); *C08G 18/6254* (2013.01); *C08G 18/778* (2013.01); *C08G 18/809* (2013.01); *C09D 175/04* (2013.01)

(58) Field of Classification Search
USPC ................ 427/379, 387, 393.5, 407.1, 412.1; 525/28, 29, 33, 38; 252/182.14, 252/182.17, 182.2; 428/423.1
See application file for complete search history.

(56) References Cited

U.S. PATENT DOCUMENTS

| | | |
|---|---|---|
| 3,718,614 A | 2/1973 | Smyth |
| 4,479,990 A | 10/1984 | Dixon et al. |
| 4,598,131 A | 7/1986 | Prucnal |
| 4,710,542 A | 12/1987 | Forgione et al. |
| 4,853,146 A | 8/1989 | Rorig et al. |
| 5,041,239 A | 8/1991 | Rorig et al. |
| 5,716,678 A | 2/1998 | Röckrath et al. |
| 6,403,699 B1 | 6/2002 | Röckrath et al. |
| 8,013,099 B2 | 9/2011 | Poppe et al. |
| 2003/0027921 A1 | 2/2003 | Speier et al. |
| 2006/0217472 A1 | 9/2006 | Staunton |
| 2010/0015344 A1 * | 1/2010 | Groenewolt et al. ...... 427/407.1 |
| 2010/0028544 A1 | 2/2010 | Groenewolt et al. |
| 2010/0143596 A1 | 6/2010 | Groenewolt et al. |
| 2011/0059251 A1 | 3/2011 | Poppe et al. |
| 2011/0245406 A1 | 10/2011 | Klein et al. |

FOREIGN PATENT DOCUMENTS

| | | |
|---|---|---|
| EP | 0 008 127 | 2/1980 |
| EP | 0 249 201 | 12/1987 |
| WO | WO 97/12945 | 4/1997 |
| WO | 01/98393 | 12/2001 |
| WO | 2007/016234 | 2/2007 |
| WO | WO 2008074489 A1 * | 6/2008 |

OTHER PUBLICATIONS

International Search Report and Written Opinion of the ISA, ISA/EP, Rijswijk, NL, mailed Jul. 5, 2010.

* cited by examiner

*Primary Examiner* — Thao T. Tran
(74) *Attorney, Agent, or Firm* — Quinn Law Group, PLLC.

(57) ABSTRACT

The present invention relates to coating compositions comprising
(A) at least one hydroxyl-containing polyacrylate and/or at least one hydroxyl-containing polymethacrylate and
(B) at least one compound containing isocyanate groups and having at least one structural unit (I) of the formula (I)

$$-NR-(X-SiR''_x(OR')_{3-x}) \qquad (I),$$

and having at least one structural unit (II) of the formula (II)

$$-N(X-SiR''_x(OR')_{3-x})_n(X'-SiR''_y(OR')_{3-y})_m \qquad (II),$$

where
(i) (A) has a glass transition temperature of less than 10° C.,
(ii) (B) contains more than 10 to more than 90 mol %, of at least one structural unit of the formula (I) and 10 to less than 90 mol % of at least one structural (II), based on the entirety of the structural units (I) and (II), and
(iii) 10 to 60 mol % of the isocyanate groups of the diisocyanate and/or polyisocyanate parent structure of (I) and (II).

The invention provides multistage coating processes using these coating compositions.

20 Claims, No Drawings

COATING COMPOSITIONS AND COATINGS PRODUCED FROM THEM AND FEATURING HIGH SCRATCH RESISTANCE IN ASSOCIATION WITH GOOD RESULTS IN THE ERICHSEN CUPPING TEST AND GOOD ANTISTONECHIP PROPERTIES

This application is a 371 U.S. National Stage of International Application No. PCT/EP2010/001422, filed Mar. 8, 2010, which claims the benefit of German Patent Application No. DE 10 2009 030 481.9, filed Jun. 24, 2009, the disclosures of both of these applications being incorporated herein by reference.

The present invention relates to thermally curable coating compositions based on aprotic solvents, comprising hydroxyl-containing polyacrylate polyols and/or hydroxyl-containing polymethacrylate polyols and compounds (B) containing isocyanate groups and silane groups.

WO 2001/98393 describes 2 K (two-component) coating compositions which comprise a polyol binder component and a polyisocyanate crosslinker component functionalized in low fractions with alkoxysilylamines, preferably with bis-alkoxysilylamines. These coating compositions are used in particular as primers and are optimized for is adhesion to metallic substrates, preferably to aluminum substrates. In terms of scratch resistance in association with good Erichsen cupping and good antistonechip properties on the part of the resulting coatings, these coating compositions are not optimized, and nor are there any indications as to how these properties can be brought about in the resultant coatings.

US-A-2006/217472 describes coating compositions which comprise a hydroxyl-containing polyacrylate polyol and/or hydroxyl-containing polymethacrylate polyol, a low molecular mass polyol component, a polyisocyanate, and an amino-functional alkoxysilyl component, preferably bisalkoxysilylamines.

Systems thus described do have scratch resistance properties, but the use of increased fractions of bisalkoxysilaneamines usually leads to systems which are weak in terms of weathering. The acrylate described, moreover, has a relatively high styrene content and contains high fractions of methacrylates, which is likely to be manifested in low Erichsen cupping values.

EP-1 273 640 describes 2K coating compositions composed of a polyol component and a crosslinker component made up of polyisocyanates in which some of the isocyanate groups have been reacted with bisalkoxysilylamine. According to this specification, all polyols having more than two hydroxyl groups are suitable. As well as polyester polyols, polycarbonate polyols, polyether polyols, and also polyols containing urethane groups and ester groups, it is also possible to employ polyacrylate and/or polymethacrylate polyols. This specification, however, is lacking details on the influence of the selected binders on the properties of the resultant coatings.

These coating compositions can be used for automotive OEM finishing and combine good scratch resistance with high stability to environmental effects. However, the better the scratch resistance of the resultant coatings, the lower their Erichsen cupping. Details as to how coatings which have good scratch resistance but at the same time have an at least adequate Erichsen cupping, and without significant impairment of the antistonechip properties, can be obtained are absent from this specification, however, as are details concerning the so-called long-term scratch resistance, in other words the scratch resistance in the case of repeated scratch exposure.

WO 08/74491, WO 08/74490, and WO 08/74489 disclose 2K coating compositions comprising polyols, such as polyester polyols, polyurethane polyols, polysiloxane polyols, preferably hydroxyl-containing polyacrylate polyols and/or hydroxyl-containing polymethacrylate polyols, and polyisocyanates in which some of the isocyanate groups have been reacted with a mixture of monoalkoxysilylamine and bis-alkoxysilylamine. These coating compositions have both good scratch resistance and high weathering stability. In order to achieve a very high scratch resistance, however, relatively high levels of silane in the coating compositions are required. It is therefore desirable to achieve a very high scratch resistance with lower levels of silane, or to further improve the scratch resistance for unchanged levels of silane. At the same time, however, there ought to be no, or no substantial, deterioration in the other properties of the coating, more particularly the good antistonechip properties and the Erichsen cupping.

The as yet unpublished patent application DE 10 2007 0 61 855.9-43 likewise discloses coating compositions which comprise at least one hydroxyl-containing compound (A), at least one compound (B) containing isocyanate groups, and at least one phosphorus catalyst, with one or more constituents of the coating composition, preferably the compounds containing isocyanate groups, containing hydrolysable silane groups in an amount of 2.5 to 97.5 mol %, based in each case on the sum of hydroxyl groups, isocyanate groups, and hydrolysable silane groups. As a is constituent essential to that invention, these coating compositions comprise at least one bicyclic amine as a further catalyst. Hydroxyl-containing compounds used are polyester polyols, polyurethane polyols, polysiloxane polyols, preferably hydroxyl-containing polyacrylate polyols and/or hydroxyl-containing polymethacrylate polyols. That specification, however, lacks details of how the scratch resistance of the coating compositions may be further improved through appropriate selection of the binders.

The as yet unpublished patent application DE 10 2008 060454.2-43 describes coating compositions which comprise at least one hydroxyl-containing compound, at least one compound containing isocyanate groups and having hydrolysable silane groups, and at least one phosphorus catalyst. To improve the visual impression it is essential to that invention to use specific polyesters as hydroxyl-containing compound.

Furthermore, EP-B-692 007 discloses coating compositions which comprise as their binder hydroxyl-containing polyacrylates based on 4-hydroxybutyl acrylate and/or 4-hydroxybutyl methacrylate, and as their crosslinker polyisocyanates. The resultant coatings have good acid resistance and a scratch resistance which is an improvement on the coating compositions employed hitherto. The use of silanized polyisocyanates, however, is not described. Details as to what influence the glass transition temperature of the selected binders has on the properties of resultant coatings, however, are absent from that specification, as are details as to how it is possible to obtain coatings featuring a further-improved scratch resistance in conjunction with good Erichsen cupping and good antistonechip properties.

WO 07/016234m lastly, discloses coating compositions, more particularly clearcoat materials, which combine good scratch resistance with good antistonechip properties. This is achieved by virtue of the corresponding is multicoat coatings exhibiting, in single-scratch measurements, a crack force of at least 26 mN and a plastic deformation resistance of at least 30 mN/μm. The coating compositions used there comprise silane-modified polyacrylate copolymers, hyperbranched polyesters, and also polyisocyanates and amino resins as crosslinkers. Coating compositions comprising alkoxysilylamine-modified polyisocyanates as crosslinkers are not described herein, and nor are details relating to influencing the Erichsen cupping of the resultant coatings.

PROBLEM

It was an object of the present invention to provide coating compositions, more particularly for the clearcoat in automotive OEM finishes and automotive refinishes, that lead to coatings having very good scratch resistances, in terms not least of long-term scratch resistance, i.e., after repeated scratch exposure, at the same time as having good results in the Erichsen cupping test and having good antistonechip properties. More particularly the coatings ought to have a scratch resistance such that the residual gloss (20° measurement angle) in accordance with the test known as the crock meter test is at least 40%, preferably at least 50%, but at the same time as attaining good Erichsen cupping values of more than 7.0 mm (average from at least 6 measurements) and good antistonechip properties. Moreover, the coatings, especially the clearcoats, ought to be able to be produced even in coat thicknesses of more than 40 µm without stress cracks occurring.

The coating compositions, furthermore ought to meet the requirements typically imposed on the clearcoat in automotive OEM finishes and automotive refinishes. Finally, the new coating compositions ought to be producible easily and with very good reproducibility, and ought not to cause any environmental problems during their application.

SOLUTION TO THE PROBLEM

In the light of the above objectives, coating compositions have been found comprising
(A) at least one hydroxyl-containing polyacrylate and/or at least one hydroxyl-containing polymethacrylate and
(B) at least one compound (B) containing isocyanate groups and having at least one structural unit (I) of the formula (I)

—NR—(X—SiR″$_x$(OR′)$_{3-x}$)     (I), and having at least one structural unit (II) of the formula (II)

—N(X—SiR″$_x$(OR′)$_{3-x}$)$_n$(X′—SiR″$_y$(OR′)$_{3-y}$)$_m$    (II), where
R=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
R′=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R′=ethyl and/or methyl,
X,X′=linear and/or branched alkylene or cycloalkylene radical having 1 to 20 carbon atoms, preferably X, X′=alkylene radical having 1 to 4 carbon atoms,
R″=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R″=alkyl radical, more particularly having 1 to 6 C atoms,
n=0 to 2,
m=0 to 2,
m+n=2, and
x,y=0 to 2, wherein
(i) the hydroxyl-containing polyacrylate and/or the hydroxyl-containing polymethacrylate have/has a glass transition temperature of less than 10° C.,
(ii) the compound (B) containing isocyanate groups contains more than 10 mol % to 90 mol %, preferably 20 mol % to 80 mol %, of at least one structural unit of the formula (I) and 10 to less than 90 mol %, preferably 20 mol % to 80 mol %, of at least one structural unit of the formula (II), based in each case on the entirety of the structural units (I) and (II), and
(iii) 10 to 60 mol % of the isocyanate groups of the diisocyanate and/or polyisocyanate parent structure of the compound (B) have been reacted to form the structural units of the formulae (I) and (II).

The present invention additionally provides multistage coating processes using these coating compositions, and also the use of the coating compositions as clearcoat or application of the coating process for automotive OEM finishing, the finishing of surface-mounted automotive components, and automotive refinish.

In the light of the prior art it was surprising and unforeseeable for the skilled worker that the objects on which the present invention was based could be achieved by means of the coating compositions of the invention.

Hence it is surprising more particularly that the coating compositions of the invention lead to coatings having very good scratch resistance, in terms not least of long-term scratch resistance, in conjunction with good results in the Erichsen cupping test and with good antistonechip properties. More particularly the coatings have a scratch resistance such that the residual gloss (20° measurement angle) in accordance with the test known as the crock meter test is at least 40%, preferably at least 50%, while at the same time obtaining good Erichsen cupping values of more than 7.0 mm (average from at least 6 measurements) and good antistonechip properties.

At the same time the coating compositions of the invention produce new coatings and paint systems, especially clearcoats, which are producible even in coat thicknesses of more than 40 µm without stress cracks occurring. Consequently the coatings and paint systems of the invention, more particularly the clearcoats, can be employed in the technologically and esthetically particularly demanding field of automotive OEM finishing.

Lastly, the coating compositions of the invention can be produced particularly easily and with very good reproducibility, and do not give rise to any significant toxicological or environmental problems in the course of their application.

DESCRIPTION OF THE INVENTION

The Coating Compositions of the Invention
The Hydroxyl-containing Compounds (A)
It is essential to the invention that the coating compositions comprise as component (A) at least one hydroxyl-containing polyacrylate and/or at least one hydroxyl-containing polymethacrylate having a glass transition is temperature Tg of less than 10° C. The hydroxyl-containing polyacrylate used as component (A) and/or the hydroxyl-containing polymethacrylate used as component (A) preferably have/has a glass transition temperature Tg of −60° C. to 5° C., more preferably of −30° C. to <0° C.

The glass transition temperature is determined by means of DSC measurements in accordance with DIN EN ISO 11357-2.

The glass transition temperature can also be first estimated theoretically with the aid of the Fox equation (III), given below, but should then be determined experimentally as described above:

$$1/T_g = \sum_{n=1}^{n=x} W_n/T_{gn} \quad \text{(III)}$$

where
$T_g$=glass transition temperature of the polyacrylate or polymethacrylate,
x=number of different copolymerized monomers,
$W_n$=weight fraction of the nth monomer, and
$T_{gn}$=glass transition temperature of the homopolymer of the nth monomer.

It is surprising that, through the use of hydroxyl-containing polyacrylates and/or hydroxyl-containing polymethacrylates which have/has a glass transition temperature Tg of less than 10° C., in each case subject to the proviso of the same curing agent fraction (B) with the same silane content and the same proportion of the structural units (I) and (II), it is possible to achieve a significant improvement in the scratch resistance of the resultant coatings in comparison to the use of the corresponding poly(meth)acrylates with the same OH number but a higher glass transition temperature Tg >10° C. It is likewise surprising that at the same time it is possible to achieve significant improvements in the Erichsen cupping values. Moreover, correspondingly, through the use of the poly (meth)acrylate polyols (A) having a glass transition temperature of less than 10° C., it is possible—in comparison to coating compositions based on poly(meth)acrylate polyols with a glass transition temperature above 10° C.—to obtain equally good scratch resistances through lower silane contents, something which is attractive from an economic standpoint as well, since the aminosilane component represents the most cost-intensive element in coating systems of this kind.

The polyacrylate polyols and/or polymethacrylate polyols that are used in accordance with the invention as component (A), referred to below for short as poly(meth)acrylate polyols, are generally copolymers. As component (A) it is preferred to use (meth)acrylate copolymers which are obtainable by copolymerizing
(a) 10% to 80%, preferably 20% to 50%, by weight of a hydroxyl-containing ester of acrylic acid, or mixtures of these monomers,
(b) 0% to 30%, preferably 0% to 15%, by weight of a hydroxyl-containing ester of methacrylic acid other than (a), or of a mixture of such monomers,
(c) 5% to 90%, preferably 20% to 70%, by weight of an aliphatic or cycloaliphatic ester of (meth)acrylic acid other than (a) and (b), having at least 4 carbon atoms in the alcohol residue, or of a mixture of such monomers,
(d) 0% to 5%, preferably 0.5% to 3.5%, by weight of an ethylenically unsaturated carboxylic acid or of a mixture of ethylenically unsaturated carboxylic acids,
(e) 0% to 50%, preferably 0% to 20%, by weight of a vinylaromatic or of a mixture of such monomers, and
(f) 0% to 50%, preferably 0% to 35%, by weight of an ethylenically unsaturated monomer other than (a), (b), (c), (d), and (e), or a mixture of such monomers,
the sum of the weight fractions of components (a), (b), (c), (d), (e), and (f) always being 100% by weight.

As hydroxyl-containing esters of acrylic acid (a) it is preferred to use 2-hydroxyethyl acrylate, 2-hydroxypropyl acrylate, 3-hydroxypropyl acrylate, 3-hydroxybutyl acrylate, and 4-hydroxybutyl acrylate, and also mixtures of such monomers.

As hydroxyl-containing esters of methacrylic acid (b) it is preferred to use 2-hydroxyethyl methacrylate, 2-hydroxypropyl methacrylate, 3-hydroxypropyl methacrylate, 3-hydroxybutyl methacrylate, and 4-hydroxybutyl methacrylate, and also mixtures of such monomers.

As further monomer elements (c) for the poly(meth)acrylate polyols it is preferred to use alkyl acrylates and/or alkyl methacrylates having at least 4 C atoms in the alkyl radical, such as preferably butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclopentyl acrylate, cyclopentyl methacrylate, isobornyl acrylate, isobornyl methacrylate, cyclohexyl acrylate and/or cyclohexyl methacrylate. As monomer (c) it is preferred to use butyl acrylate, butyl methacrylate, hexyl acrylate, hexyl methacrylate, ethylhexyl acrylate and ethylhexyl methacrylate.

As component (e) use is made more particularly of styrene, and as component (d) use is made more particularly of acrylic acid. As component (f) it is possible more particularly to use alkyl esters and hydroxyalkyl esters of other ethylenically unsaturated carboxylic acids.

The poly(meth)acrylate polyols (A) used in accordance with the invention preferably have mass-average molecular weights Mw of between 1000 and 20 000 daltons, more particularly between 1500 and 10 000 daltons, measured in each case by means of gel permeation chromatography (GPC) against a polystyrene standard.

The poly(meth)acrylate polyols (A) preferably have an OH number of 60 to 300 mg KOH/g, more particularly between 100 and 250 mg KOH/g, very particularly between 150 and 200 mg KOH/g. The hydroxyl number (OH number) indicates the number of mg of potassium hydroxide that are equivalent to the amount of acetic acid attached in acetylation by 1 g of substance. In the determination, the sample is boiled with acetic anhydride-pyridine and the resultant acid is titrated with potassium hydroxide solution (DIN 53240-2).

The poly(meth)acrylate polyols (A) preferably have an acid number of between 0 and 30 mg KOH/g. The acid number here indicates the number of mg of potassium hydroxide consumed in the neutralization of 1 g of the respective compound of component (b) (DIN EN ISO 2114).

The Compounds (B) Containing Isocyanate Groups

As component (B) the coating compositions of the invention comprise one or more compounds having free, i.e., non-blocked, and/or blocked isocyanate groups. Preferably the coating compositions of the invention comprise compounds (B) having free isocyanate groups. The free isocyanate groups of the compounds B containing isocyanate groups may also, however, be used in a blocked form. This is preferentially the case when the coating compositions of the invention are used as one-component systems.

The diisocyanates and/or polyisocyanates that serve as parent structures for the compounds (B) containing isocyanate groups that are employed with preference in accordance with the invention are conventional substituted or unsubstituted, aromatic, aliphatic, cycloaliphatic and/or heterocyclic polyisocyanates. Examples of preferred polyisocyanates are as follows: 2,4-toluene diisocyanate, 2,6-toluene diisocyanate, diphenylmethane 4,4'-diisocyanate, diphenylmethane 2,4'- diisocyanate, p-phenylene diisocyanate, biphenyl diisocyanates, 3,3'-dimethyl-4,4'-diphenylene diisocyanate, tetramethylene 1,4-diisocyanate, hexamethylene 1,6-diisocyanate, 2,2,4-trimethylhexane 1,6-diisocyanate, isophorone diisocyanate, ethylene diisocyanate, 1,12-dodecane diisocyanate, cyclobutane 1,3-diisocyanate, cyclohexane 1,3-diisocyanate, cyclohexane 1,4-diisocyanate, methylcyclohexyl diisocyanates, hexahydrotoluene 2,4-diisocyanate, hexahydrotoluene 2,6-diisocyanate, hexahydrophenylene 1,3-diisocyanate, hexahydrophenylene 1,4-diisocyanate, perhydrodiphenylmethane 2,4'-diisocyanate, 4,4'-methylenedicyclohexyl diisocyanate (e.g., Desmodur® W from Bayer AG), tetramethylxylyl diisocyanates (e.g., TMXDI® from American Cyanamid), and mixtures of the aforementioned polyisocyanates. Additionally preferred polyisocyanates are the biuret dimers and the isocyanurate trimers of the aforementioned diisocyanates.

Particularly preferred diisocyanate parent structures and polyisocyanate parent structures are diisocyanates and/or polyisocyanates having a glass transition temperature of less than or equal to 0° C., preferably a glass transition temperature of −100° C. to −20° C. The glass transition temperature in this case is determined by means of DSC measurements is in accordance with DIN EN ISO 11357-2. Especially preferred diisocyanate parent structures and polyisocyanate parent structures are hexamethylene 1,6-diisocyanate and/or the isocyanurate trimers thereof and/or the allophanate dimers thereof.

In a further embodiment of the invention the polyisocyanates are polyisocyanate prepolymers with urethane structural units, which are obtained by reacting polyols with a stoichiometric excess of aforementioned polyisocyanates. Polyisocyanate prepolymers of this kind are described in U.S. Pat. No. 4,598,131, for example.

The compounds containing isocyanate groups that are used as component (B) contain at least one structural unit (I) of the formula (I)

—NR—(X—SiR"x(OR')3-x)    (I), and at least one structural unit (II) of the formula (II)

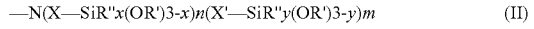

—N(X—SiR"x(OR')3-x)n(X'—SiR"y(OR')3-y)m    (II)

where
R=hydrogen, alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl,
R'=hydrogen, alkyl or cycloalkyl, it being possible for the carbon chain to be interrupted by nonadjacent oxygen, sulfur or NRa groups, with Ra=alkyl, cycloalkyl, aryl or aralkyl, preferably R'=ethyl and/or methyl,
X,X'=linear and/or branched alkylene or cycloalkylene radical having 1 to 20 carbon atoms, preferably X, X'=alkylene radical having 1 to 4 carbon atoms,
R"=alkyl, cycloalkyl, aryl or aralkyl, it being possible for the carbon chain to be interrupted by nonadjacent oxygen, sulfur or NRa groups, with Ra=alkyl, cycloalkyl, aryl or aralkyl, preferably R"=alkyl radical, more particularly having 1 to 6 C atoms,
n=0 to 2,
m=0 to 2,
m+n=2, and
x,y=0 to 2.

The respective preferred alkoxy radicals (OR') may be alike or different—what is critical for the structure of the radicals, however, is to what extent they influence the reactivity of the hydrolyzable silane groups. Preferably R' is an alkyl radical, more particularly having 1 to 6 C atoms. Particularly preferred are radicals R' which raise the reactivity of the silane groups, i.e., which constitute good leaving groups. Thus a methoxy radical is preferred over an ethoxy radical, which is preferred in turn over a propoxy radical. With particular preference, therefore, R' is ethyl and/or methyl, more particularly methyl.

The reactivity of organofunctional silanes can also be influenced considerably, furthermore, by the length of the spacers X, X' between silane functionality and organic functional group serving for reaction with the modifying constituent. As an example of this, mention may be made of the "alpha" silanes, which are available from Wacker, and in which there is a methylene group, rather than the propylene group present in "gamma" silanes, between the Si atom and the functional group.

The compounds (B) containing isocyanate groups and functionalized with the structural units (I) and (II), as used in accordance with the invention, is are obtained with particular preference by reaction of the aforementioned diisocyanates and/or polyisocyanates with at least one compound of the formula (Ia)

H—NR—(X—SiR"x(OR')3-x)    (Ia), and with at least one compound of the formula (IIa)

HN(X—SiR"x(OR')3-x)n(X'—SiR"y(OR')3-y)m    (IIa), the substituents being as defined above.

Inventively preferred compounds (IIa) are bis(2-ethyltrimethoxysilyl)amine, bis(3-propyltrimethoxysilyl)amine, bis(4-butyltrimethoxysilyl)amine, bis(2-ethyltriethoxysilyl)amine, bis(3-propyltriethoxysilyl)amine and/or bis(4-butyltriethoxysilyl)amine. bis(3-Propyltrimethoxysilyl) amine is especially preferred. Aminosilanes of this kind are available, for example, under the brand name DYNASYLAN® from DEGUSSA or Silquest® from OSI.

Inventively preferred compounds (Ia) are aminoalkyltrialkoxysilanes, such as preferably 2-aminoethyltrimethoxysilane, 2-aminoethyltriethoxysilane, 3-aminopropyltrimethoxysilane, 3-aminopropyltriethoxysilane, 4-aminobutyltrimethoxysilane, 4-aminobutyltriethoxysilane. Particularly preferred compounds (Ia) are N-(2-(trimethoxysilyl)ethyl)alkylamines, N-(3-(trimethoxysilyl)propyl)alkylamines, N-(4-(trimethoxysilyl)butyl)alkylamines, N-(2-(triethoxysilyl)ethyl)alkylamines, N-(3-(triethoxysilyl)-propyl)alkylamines and/or N-(4-(triethoxysilyl)butyl) alkylamines. N-(3-(Trimethoxysilyl)propyl)butylamine is especially preferred. Aminosilanes of this kind are available, for example, under the brand name DYNASYLAN® from DEGUSSA or Silquest® from OSI.

Especially preferred compounds (B) containing isocyanate groups are reaction products of hexamethylene 1,6-diisocyanate and/or the isocyanurate trimers thereof and/or the allophanate dimers thereof with bis(3-propyltrimethoxysilyl) amine and N-(3-(trimethoxysilyl)propyl)butylamine.

The solids content of the polyisocyanate curing agent (B) used in accordance with the invention is advantageously at least 50%, preferably at least 70%, by weight.

It is essential to the invention that the compound (B) containing isocyanate groups contains more than 10 mol % to 90 mol %, preferably 20 to 80 mol %, more preferably 30 to 70 mol %, of at least one structural unit (I) of the formula (I) and 10 to less than 90 mol %, preferably 20 to 80 mol %, more preferably 30 to 70 mol %, of at least one structural unit (II) of the formula (II), based in each case on the entirety of the structural units (I) and (II).

Surprisingly it has now been found that in particular the ratio of the structural units (I) of the formula (I) to the structural units (II) of the formula (II) has a quite critical influence on the results of Erichsen cupping of the resultant coating. In this relationship, generally speaking, the Erichsen cupping of the resultant coatings increases with increasing fraction of monosilane structural units (I) and with decreasing fraction of bissilane structural units (II). This influence of the ratio of the structural units (I)/(II) on the Erichsen cupping in general increases in proportion with the fraction of isocyanate groups in the polyisocyanate parent structure that have undergone reaction to form the structural units (I) and (II). In other words, the higher the degree of silanization, in other words the higher the fraction of isocyanate groups that have reacted to form the structural units (I) plus (II), based on the overall solids of the coating composition, the is greater the influence of the ratio of the structural units (I) to the structural units (II) on the Erichsen cupping. These influences of course apply only when the other parameters of the coating composition, such as the glass transition temperature of component (A) and the proportions of the individual components, for example, are each constant.

Very surprising, and also highly advantageous, is the fact that, simultaneously with the improvement in the Erichsen cupping through an increasing fraction of mono structural units (I) and a decreasing fraction of bissilane structural units (II), there is only a very slight deterioration in the scratch resistance of the resultant coating and also in the antistonechip properties of the resultant coatings, with the proviso, however, that the degree of silanization is neither too low nor too high—that is, that the fraction of isocyanate groups that have reacted to form the structural units (I) plus (II), based on the overall solids of the coating composition, is neither too low nor too high.

At the same time the scratch resistance of the resultant coatings generally increases with increasing degree of silanization—that is, the higher the proportion of the isocyanate groups that have reacted to form the structural units (I) and (II), based on the overall solids of the coating composition, the higher the scratch resistance. Surprisingly, however, in accordance with the invention, through the use of the hydroxyl-containing poly(meth)acrylates having a glass transition temperature below 10° C., it is indeed possible to attain a high scratch resistance even with relatively low fractions of structural units (I) and (II), i.e., at relatively low degrees of silanization. As a result of this, success is achieved in accordance with the invention in providing coating compositions that lead to coatings having a high scratch resistance and, at the same time, high Erichsen cupping values and good antistonechip protection.

It is therefore likewise essential to the invention that 10% to 60 mol %, preferably 20 to 40 mol %, of the isocyanate groups of the polyisocyanate parent structure of the compound (B) have undergone reaction to form the structural units of the formula (I) and (II). The Erichsen cupping of the resultant coatings in this relationship generally increases as the fraction of isocyanate groups that have reacted to form the structural units (I) and (II) goes down, when the ratio of the structural units (I) to the structural units (II) remains constant and also all other characteristics of the coating composition, such as OH number and the glass transition temperature of component (A), for example, remain constant. Moreover, high Erichsen cupping values are obtained from the resultant coatings even when the fraction of isocyanate groups that have undergone reaction to form the structural units (I) and (II) is relatively high, but the fraction of structural units (I) is very high and the fraction of structural units (II) is very low, and at the same time, preferably, the glass transition temperature of component (A) is extremely low.

Particular preference is given in accordance with the invention to coating compositions which have a calculated silicon content of 1.5% to 6.0% by mass Si, preferably a calculated silicon content of 2.0% to 5.0% by mass Si, based in each case on the solids content of the coating composition. This stated calculated silicon content corresponds to the silicon content expected in thermogravimetric analysis, in % by mass, and is calculated on the basis of the raw materials used by subtracting all of the organic radicals attached to the silicon, and including only half of the oxygen atoms on the silicon. For example, each Si(OR)3 group is considered as $SiO_{1.5}$ for the purposes of the calculation of the silicon fraction. This contributes to comparability of coating systems which feature different leaving groups OR on the silicon. In particular, therefore, methoxy radicals and ethoxy radicals do not alter the calculated silicon fraction. This does take account, therefore, of the fact that these radicals OR are very largely no longer present in the cured coating film.

The polyisocyanate curing agent used in accordance with the invention preferably comprises at least one water scavenger, examples being reactive silanes having a higher reactivity toward water than isocyanates. As water scavengers it is advantageous more particularly to use orthoformic acid trialkyl esters. A particularly preferred water scavenger used is triethyl orthoformate. Preference is given to adding 0.01% to 10% by weight, preferably 0.03% to 5.0% by weight, of at least one water scavenger, based on the total nonvolatile fractions content of the coating composition.

The reaction of the compounds (B) containing isocyanate groups with the compounds (Ia) and (IIa) takes place preferably in an inert gas atmosphere at temperatures of not more than 100° C., preferably of not more than 60° C. Preferably the reaction of the compounds (B) containing isocyanate groups with the compounds (Ia) and (IIa) takes place in a solvent or in a solvent mixture in the presence of at least one water scavenger and in the presence of at least one amine, preferably in the presence of at least one tertiary amine, such as, for example, 1,4-diazabicyclo[2.2.2]octane (DABCO), triethylamine, and diisopropylethylamine, more particularly triethylamine.

Preferably during the synthesis at least 1%, preferably at least 2%, more preferably at least 3%, and very preferably at least 4% by weight of at least one water scavenger is added, preferably triethyl orthoformate, based on the total nonvolatile fractions content of the reaction mixture.

Preferably the amine is used during the synthesis in an amount of 2% to 6% by weight, based on the total nonvolatile fractions content of the reaction mixture. With particular preference triethylamine is used during the synthesis in an amount of 1.5 to 3.5% by weight, based on the total nonvolatile fractions content of the reaction mixture.

The solvent or solvent mixture in which the polyisocyanate curing agents are prepared may be composed of aromatic hydrocarbons such as 1,2,4-trimethylbenzene, mesitylene, xylene, propylbenzene, and isopropylbenzene. One example of a suitable solvent mixture comprising aromatic hydrocarbons is solvent naphtha. The solvent in which the polyisocyanate curing agents are prepared may also be composed of aliphatic hydrocarbons, ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents, preference being given to solvent mixtures having a half fraction of butyl acetate, more particularly at least 60% by weight of butyl acetate, based on the total weight of the solvent mixture. With particular preference the solvent mixture contains at least 80% by weight of butyl acetate, more particularly at least 95% by weight of butyl acetate. It is especially advantageous to operate in pure butyl acetate.

Alternatively the polyisocyanate curing agent can also be prepared preferably by reacting in a first step on average per molecule not more than one of the isocyanate groups of the polyisocyanate, more particularly of a diisocyanate, with the compounds (Ia) and (IIa), and in a second step reacting the resultant intermediate by dimerization, trimerization, urethanization, biuretization or allophanatization to form a polyisocyanate.

The free isocyanate groups of the compounds (B) containing isocyanate groups can also be used in a blocked form. This is preferentially the case when the coating compositions of the invention are used as one-component systems. For blocking it is possible in principle to use any blocking agents which can be used for blocking polyisocyanates and which have a sufficiently low deblocking temperature. Blocking agents of this kind are familiar to the skilled worker. Preference is given to using blocking agents of the kind described in EP-A-0 626 888 and EP-A-0 692 007.

The Combination of Components (A) and (B) and Also Further Components of the Coating Composition The weight fractions of polyol (A) and of polyisocyanate (B) are preferably selected such that the molar equivalent ratio of the unreacted isocyanate groups of the isocyanate-containing compounds (B) to the hydroxyl groups of the hydroxyl-containing compounds (A) is between 0.9:1 and 1:1.1, preferably between 0.95:1 and 1.05:1, more preferably between 0.98:1 and 1.02:1.

In accordance with the invention it is preferred to use coating compositions which contain from 20% to 80% by weight, preferably from 30% to 70% by weight, based in each case on the solids content of the coating composition, of at least one hydroxyl-containing polyacrylate (A) and/or at least one hydroxyl-containing polymethacrylate (A).

In accordance with the invention it is preferred to use coating compositions which contain from 20% to 80% by weight, preferably from 30% to 70% by weight, based in each case on the solids content of the coating composition, of at least one compound (B) containing isocyanate groups.

In the case of one-component coating compositions, the compounds (B) containing isocyanate groups that are selected are those whose free isocyanate groups are blocked with the above-described blocking agents.

In the case of the inventively preferred 2-component (2K) coating compositions, the application of the coating composition is shortly preceded by the mixing of a coatings component comprising the hydroxyl-containing compound (A) and also further components, described below, with a further coatings component comprising the compound (B) containing isocyanate groups, and, if desired, other of the below-described components, this mixing taking place in a conventional manner; in general, the coatings component that comprises the compound (A) comprises the catalyst and also some of the solvent.

Besides the hydroxyl-containing component (A), the coating compositions of the invention may optionally further comprise one or more hydroxyl-containing compounds (C), which are different from component (A). These binders (C) preferably account for a fraction of 10% to 50% by weight, more preferably of 20% to 40% by weight, based on the nonvolatiles fraction of the polyol component (A)+(C).

As hydroxyl-containing compound (C) use is made not only of low molecular mass polyols but also of oligomeric and/or polymeric polyols.

Examples of low molecular mass polyols are diols, such as preferably ethylene glycol, neopentylglycol, 1,2-propanediol, 2,2-dimethyl-1,3-propanediol, 1,4-butanediol, 1,3-butanediol, 1,5-pentanediol, 2,2,4-trimethyl-1,3-pentanediol, 1,6-hexanediol, 1,4-cyclohexanedimethanol, and 1,2-cyclohexanedimethanol, and also polyols, such as preferably trimethylolethane, trim ethylolpropane, trimethylolhexane, 1,2,4-butanetriol, pentaerythritol, and dipentaerythritol.

Low molecular mass polyols of this kind are preferably admixed in minor fractions to the polyol component (A).

Oligomeric and/or polymeric polyols (C) used are, for example, polyester polyols, polyurethane polyols, polysiloxane polyols, and, preferably, polyacrylate polyols and/or polymethacrylate polyols that are different from component (A); as component (C) it is especially preferred to use polyacrylate polyols and/or polymethacrylate polyols which have a glass transition temperature of at least 10° C., more particularly of 20 to 80° C. Here as well the glass transition temperature is determined experimentally in a manner similar to the determination of the glass transition temperature of component (A).

Catalyst (D)

The coating compositions of the invention preferably comprise at least one catalyst (D) for the crosslinking of the silane groups. Examples are metal complexes with chelate ligands based on zinc or aluminum, such as the Lewis acids or titanates described in WO 05/03340, for example—when selecting the catalysts, however, it must be ensured that they do not lead to yellowing of the coating compositions. Moreover, a number of catalysts whose use is known are less desirable for reasons of toxicology.

It is therefore preferred to use phosphorus catalysts, more particularly phosphorus and nitrogen catalysts as catalyst (D). It is also possible in this case to use mixtures of two or more different catalysts (D).

Examples of suitable phosphorus catalysts (D) are substituted phosphonic diesters and diphosphonic diesters, preferably from the group consisting of acyclic phosphonic diesters, cyclic phosphonic diesters, acyclic diphosphonic diesters, and cyclic diphosphonic diesters. Catalysts of this kind are described from example in the German patent application DE-A-102005045228.

Use is made more particularly, however, of substituted phosphoric monoesters and phosphoric diesters, preferably from the group consisting of acyclic phosphoric diesters and cyclic phosphoric diesters, more preferably amine adducts of the phosphoric monoesters and diesters. The acyclic phosphoric diesters (D) are selected more particularly from the group consisting of acyclic phosphoric diesters (D) of the general formula (IV):

(IV)

where the radicals $R_{10}$ and $R_{11}$ are selected from the group consisting of:
substituted and unsubstituted alkyl having 1 to 20, preferably 2 to 16, and more particularly 2 to 10 carbon atoms, cycloalkyl having 3 to 20, preferably 3 to 16, and more particularly 3 to 10 carbon atoms, and aryl having 5 to 20, preferably 6 to 14, and more particularly 6 to 10 carbon atoms, substituted and unsubstituted alkylaryl, arylalkyl, alkylcycloalkyl, cycloalkylalkyl, arylcycloalkyl, cycloalkylaryl, alkylcycloalkylaryl, alkylarylcycloalkyl, arylcycloalkylalkyl, arylalkylcycloalkyl, cycloalkylalkylaryl, and cycloalkylarylalkyl, the alkyl, cycloalkyl, and aryl groups present therein in each case containing the above-recited number of carbon atoms, and substituted and unsubstituted radical of the type recited above, comprising at least one, more particularly one, heteroatom selected from the group consisting of oxygen atom, sulfur atom, nitrogen atom, phosphorus atom, and silicon atom, more preferably oxygen atom, sulfur atom, and nitrogen atom, and additionally also being able to represent hydrogen (partial esterification).

As catalyst (D) it is especially preferred to use the corresponding amine-blocked phosphoric esters, and more particularly amine-blocked ethylhexyl phosphates and amine-blocked phenyl phosphates, very preferably amine-blocked bis(2-ethylhexyl) phosphate.

Examples of amines with which the phosphoric esters are blocked are more particularly tertiary amines, examples being bicyclic amines, such as diazabicyclooctane (DABCO), diazabicyclononene (DBN), diazabicycloundecene (DBU), dimethyldodecylamine or triethylamine. For the blocking of the phosphoric esters it is particularly preferred to use tertiary amines, which ensure high activity of the catalyst under the curing conditions of 140° C.

Certain amine-blocked phosphoric acid catalysts are also available commercially (e.g., Nacure products from King Industries). By way of example, under the designation Nacure 4167, King Industries offer a particularly suitable catalyst which is based on an amine-blocked phosphoric acid partial ester.

The catalysts are used preferably in fractions of 0.01 to 20%, more preferably in fractions of 0.1% to 10%, by weight, based on the nonvolatile constituents of the coating composition of the invention. A lower activity on the part of the catalyst can be partly compensated by correspondingly higher quantities employed.

The coating compositions of the invention may further comprise an additional amine catalyst based on a bicyclic amine, more particularly an unsaturated bicyclic amine. Examples of suitable amine catalysts are 1,5-diazabicyclo[4.3.0]non-5-ene or 1,8-diazabicyclo[5.4.0]undec-7-ene.

These amine catalysts are used preferably in fractions of 0.01% to 20%, more preferably in fractions of 0.1% to 10%, by weight, based on the nonvolatile constituents of the coating composition of the invention.

Solvents suitable for the coating compositions of the invention are in particular those which within the coating composition are chemically inert toward the compounds (A), (B), and, where used, (C) and which also do not react with (A) and (B) when the coating composition is cured. Examples of such solvents are aliphatic and/or aromatic hydrocarbons such as toluene, xylene, solvent naphtha, Solvesso 100 or Hydrosol® (from ARAL), ketones, such as acetone, methyl ethyl ketone or methyl amyl ketone, esters, such as ethyl acetate, butyl acetate, pentyl acetate or ethyl ethoxypropionate, ethers, or mixtures of the aforementioned solvents. The aprotic solvents or solvent mixtures preferably have a water content of not more than 1% by weight, more preferably not more than 0.5% by weight, based on the solvent.

Besides the compounds (A), (B), and, where used, (C) it is possible additionally to use further binders (E), which preferably are able to react and form network points with the hydroxyl groups of the poly(meth)acrylate (A) and/or with the free isocyanate groups of the compound (B) and/or with the alkoxysilyl groups of the compounds (B) and/or (C).

By way of example it is possible to use amino resins and/or epoxy resins as component (E). Suitable amino resins are the typical, known amino resins, some of whose methylol and/or methoxymethyl groups may have been defunctionalized by means of carbamate or allophanate groups. Crosslinking agents of this kind are described in U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, volume 13, pages 193 to 207.

In general such components (E) are used in fractions of up to 40%, preferably of up to 30%, more preferably of up to 25%, by weight, based on the nonvolatile constituents of the coating composition.

The binder mixture or coating composition of the invention may further comprise at least one typical, known coatings additive (F) in effective amounts, i.e., in amounts preferably up to 30%, more preferably up to 25%, and in particular up to 20% by weight, based in each case on the nonvolatile constituents of the coating composition.

Examples of suitable coatings additives (F) are:
particularly UV absorbers;
particularly light stabilizers such as HALS compounds, benzotriazoles or oxalanilides;
free-radical scavengers;
slip additives;
polymerization inhibitors;
defoamers;
reactive diluents, of the kind which are common knowledge from the prior art, and which are preferably inert toward the —Si(OR)3 groups;
wetting agents such as siloxanes, fluorine compounds, carboxylic monoesters, phosphoric esters, polyacrylic acids and their copolymers, or polyurethanes;
adhesion promoters such as tricyclodecanedimethanol;
flow control agents;
film-forming assistants such as cellulose derivatives;
fillers such as, for example, nanoparticles based on silicon dioxide, aluminum oxide or zirconium oxide; for further details refer to Römpp Lexikon "Lacke and Druckfarben" Georg Thieme Verlag, Stuttgart, 1998, pages 250 to 252;
rheology control additives, such as the additives known from patents WO 94/22968, EP-A-0 276 501, EP-A-0 249 201 or WO 97/12945; crosslinked polymeric microparticles, as disclosed for example in EP-A-0 008 127; inorganic phyllosilicates such as aluminum-magnesium silicates, sodium-magnesium, and sodium-magnesium-fluorine-lithium phyllosilicates of the montmorillonite type; silicas such as Aerosils®; or synthetic polymers containing ionic and/or associative groups such as polyvinyl alcohol, poly(meth)acrylamide, poly(meth)acrylic acid, polyvinylpyrrolidone, styrene-maleic anhydride copolymers or ethylene-maleic anhydride copolymers and their derivatives, or hydrophobically modified ethoxylated urethanes or polyacrylates;
flame retardants and/or
the above-recited water scavengers.

In a further embodiment of the invention the binder mixture or coating composition of the invention may additionally comprise further pigments and/or fillers and may serve for producing pigmented topcoats. The pigments and/or fillers employed for this purpose are known to the skilled worker.

Because the coatings of the invention produced from the coating compositions of the invention adhere excellently even to electrocoats, surfacer coats, basecoat systems or typical, known clearcoat systems that have already cured, they are outstandingly suitable not only for use in automotive OEM (production line) finishing but also for automotive refinish or for the modular scratchproofing of automobile bodies that have already been painted.

The coating compositions of the invention can be applied by any of the typical application methods, such as spraying, knife coating, spreading, pouring, dipping, impregnating, trickling or rolling, for example. In the course of such application, the substrate to be coated may itself be at rest, with the application equipment or unit being moved. Alternatively the substrate to be coated, in particular a coil, may be moved, with the application unit at rest relative to the substrate or being moved appropriately.

Preference is given to employing spray application methods, such as compressed-air spraying, airless spraying, high-speed rotation, electrostatic spray application (ESTA), alone or in conjunction with hot spray application such as hot-air spraying, for example.

The applied coating compositions of the invention can be cured after a certain rest time. The rest time serves, for example, for the leveling and devolatilization of the coating films or for the evaporation of volatile constituents such as solvents. The rest time may be assisted and/or shortened by the application of elevated temperatures and/or by a reduced humidity, provided this does not entail any damage or alteration to the coating films, such as premature complete crosslinking, for instance.

The thermal curing of the coating compositions has no peculiarities in terms of method but instead takes place in accordance with the typical, known methods such as heating in a forced-air oven or irradiation with IR lamps. The thermal cure may also take place in stages. Another preferred curing method is that of curing with near infrared (NIR) radiation.

The thermal cure takes place advantageously at a temperature of 30 to 200° C., more preferably 40 to 190° C., and in particular 50 to 180° C. for a time of 1 min up to 10 h, more preferably 2 min up to 5 h, and in particular 3 min to 3 h, although longer cure times may be employed in the case of the temperatures that are employed for automotive refinish and for the painting of plastic parts, which are preferably between 30 and 90° C.

The coating compositions of the invention produce new cured coatings, especially coating systems, more particularly clearcoat systems, moldings, especially optical moldings, and self-supporting films, all of which are highly scratch resistant, the high scratch resistance being retained even after long-term exposure. At the same time, the coatings obtained in accordance with the invention are notable for good results in the Erichsen cupping test and good antistonechip properties. Moreover, the coatings obtained in accordance with the invention also have a very good overall appearance. Lastly, the coatings and coating systems of the invention, especially the clearcoat systems, can be produced even in film thicknesses >40 μm without stress cracks occurring.

For these reasons the coating compositions of the invention are of excellent suitability as decorative, protective and/or effect-imparting, highly scratch resistant coatings and coating systems on bodies of means of transport (especially motor vehicles, such as motor cycles, buses, trucks or automobiles) or parts thereof; on buildings, for both interior and exterior; on furniture, windows, and doors; on plastics moldings, especially CDs and windows; on small industrial parts, on coils, containers, and packaging; on white goods; on films; on optical, electrical, and mechanical components; and on hollow glassware and articles of everyday use.

The coating compositions and coating systems of the invention, especially the clearcoat systems, are employed in particular in the technologically and esthetically particularly demanding field of automotive OEM (production line) finishing and for the coating of plastic parts for installation in and on automobile bodies, particularly for top-class automobile bodies, such as, for example, for the production of roofs, trunk lids, hoods, fenders, bumpers, spoilers, sills, trim strips, side trim, and the like, and also of automotive refinish.

The plastic parts are typically composed of ASA, polycarbonates, blends of ASA and polycarbonates, polypropylene, polymethyl methacrylates or impact-modified polymethyl methacrylates, more particular blends of ASA and polycarbonates, preferably with a polycarbonate fraction >40%, more particularly >50%.

By ASA is meant, generally, impact-modified styrene/acrylonitrile polymers, where graft copolymers of vinylaromatic compounds, more particularly styrene, and of vinyl cyanides, more particularly acrylonitrile, are present on polyalkyl acrylate rubbers in a copolymer matrix of styrene and acrylonitrile in particular.

With particular preference the coating compositions of the invention are used in multistage coating methods, more particularly in methods in which an uncoated or precoated substrate has applied to it first a pigmented basecoat and thereafter a coat with the coating composition of the invention. The invention hence also provides multicoat color and/or effect paint systems comprising at least one pigmented basecoat and at least one clearcoat disposed thereon, wherein the clearcoat has been produced from the coating composition of the invention.

Not only water-thinnable basecoat materials but also basecoat materials based on organic solvents can be used. Suitable basecoat materials are described for example in EP-A-0 692 007 and in the documents cited there in column 3 lines 50 et seq. The applied basecoat material is preferably first dried, i.e., at least some of the organic solvent and/or water is stripped from the basecoat film in an evaporation phase. Drying is accomplished preferably at temperatures from room temperature to 80° C. Drying is followed by the application of the coating composition of the invention. Subsequently the two-coat system is baked, preferably under conditions employed for automotive OEM finishing, at temperatures from 30 to 200° C., more preferably 40 to 190° C., and in particular 50 to 180° C., for a time of 1 min up to 10 h, more preferably 2 min up to 5 h, and in particular 3 min to 3 h, although longer cure times may also be employed at the temperatures employed for automotive refinish, which are preferably between 30 and 90° C.

The coats produced with the coating composition of the invention are notable in particular for an especially high scratch resistance, even after long-term exposure, and at the same time exhibit good results in the Erichsen cupping test and also good antistonechip properties. Lastly, they also have a very good overall appearance.

In a further preferred embodiment of the invention, the coating composition of the invention is used as a transparent clearcoat material for coating plastics substrates, more particularly plastic parts for installation in or on substrates. These plastics parts are preferably likewise coated in a multistage coating process, in which a substrate which is uncoated or precoated, or a substrate which has been pretreated for improved adhesion of the subsequent coatings (by means, for example, of flame, corona or plasma treatment of the substrate) is coated first with a pigmented basecoat and thereafter with a coat comprising the coating composition of the invention.

Lastly, the coating composition of the invention is used as a transparent clearcoat material for coating transparent plastics substrates. In this case the coating compositions include UV absorbers, which in terms of amount and type are also designed for effective UV protection of the plastics substrate. Here as well, the coatings obtained are notable for an outstanding combination of scratch resistance—even on long-term exposure—in conjunction with very good properties in the Erichsen cupping test. The transparent plastics substrates thus coated are used preferably as a substitute for glass components in automobile construction, the plastics substrates being composed preferably of polymethyl methacrylate or polycarbonate.

EXAMPLES

Preparation of the Poly(meth)acrylate Polyols A1 to A4

In a double-walled 4 l stainless steel tank which can be heated by means of an oil circulation thermostat and is equipped with thermometer, anchor stirrer, 2 dropping funnels, and reflux condenser, solvent is introduced for the polymerization. One of the dropping funnels is charged with the monomer mixture, the second dropping funnel with the initiator solution, comprising a suitable initiator (generally a peroxide). The initial charge is heated to a polymerization temperature of 140° C. When the polymerization temperature has been reached, the initiator feed is started first of all. 15 minutes after the beginning of the initiator feed, the monomer feed (duration: 240 minutes) is started. The initiator feed is set so as to continue for 30 minutes after the end of the monomer feed. After the end of the initiator feed, the mixture is stirred at 140° C. for a further 2 hours and then cooled to room temperature. subsequently the reaction mixture is adjusted with solvent to the solids content specified in table 2.

TABLE 1

Monomer composition of the binders (A1) to (A4) in parts by weight

| Component | Example 1 (A1) Parts by weight | Comp. ex. C1 (A2) Parts by weight | Example 2 (A3) Parts by weight | Comp. ex. C2 (A4) Parts by weight |
|---|---|---|---|---|
| Styrene | | 4.6 | 8.3 | 8.3 |
| 3-Hydroxypropyl methacrylate | | 13.0 | | 21.7 |
| n-Butyl methacrylate | | 8.7 | 8.9 | 3.1 |
| Acrylic acid | 1.7 | | 0.6 | 0.6 |
| Cyclohexyl methacrylate | | | | 16.8 |
| 4-Hydroxybutyl acrylate | 7.4 | 3.5 | 12.8 | 6.2 |
| Ethylhexyl acrylate | 5.0 | | | |
| tert-Butyl acrylate | 24.8 | 25.1 | | |
| 3-Hydroxypropyl acrylate | 9.3 | | | |
| Ethylhexyl methacrylate | | | | 16.8 |
| Isobutyl methacrylate | | 2.9 | | |
| 2-Hydroxyethyl acrylate | | | 12.8 | |
| n-Butyl acrylate | 13.8 | | 20.4 | |

TABLE 2

Characteristics of the binders (A1) to (A4)

| | Example 1 | Comp. ex. C1 | Example 2 | Comp. ex. C2 |
|---|---|---|---|---|
| Binder | (A1) | (A2) | (A3) | (A4) |
| Solids 1 h 150° C. | 65% | 60% | 65% | 65% |
| Acid number[1] calculated [mg KOH/g] | 20-25 | 5-10 | 8-12 | 5-10 |
| OH number[2] calculated [mg KOH/g] | 110 | 110 | 175 | 175 |
| Tg (FOX)[3] ° C. | −6 | 53 | −27 | 29 |

[1] Experimentally determined acid number
[2] Calculated OH number based on the amount of hydroxyl-containing monomers
[3] Glass transition temperature calculated according to the Fox equation

Preparation of a Curing Agent (B1) with a Degree of Conversion of the Isocyanate Groups c=30 mol % and a Fraction of 10 mol % of Monosilane Structural Units (I) and 90 mol % of Bissilane Structural Units (II)

A three-neck glass flask equipped with a reflux condenser and a thermometer is charged with 51.4 parts of trimerized hexamethylene diisocyanate (HDI) (Desmodur N3600, Bayer Material Science), 2.4 parts of triethyl orthoformate and 17.8 parts of butyl acetate. With nitrogen blanketing and stirring, a mixture of 26.4 parts of bis[3-(trimethoxysilyl)propyl]amine (Dynasylan 1124, Degussa, Rheinfelden) and 2.0 parts of N-[3-(trimethoxysilyl)propyl]butylamine (Dynasylan 1189, Degussa, Rheinfelden) is metered in at a rate such that 50° C. are not exceeded. After the end of the metered addition, the reaction temperature is held at 50° C. for 60 minutes. The degree of blocking is investigated by means of titration (ωNCO=8.1%).

The curing agent has a nonvolatiles fraction of 80% by weight.

Preparation of a Curing Agent (B2) with a Degree of Conversion of the Isocyanate Groups c=30 mol % and 40 mol % of Monosilane Structural Units (I) and 60 mol % of Bissilane Structural Units (II)

A three-neck glass flask equipped with a reflux condenser and a thermometer is charged with 53.4 parts of trimerized hexamethylene diisocyanate (HDI) (Desmodur N3600, Bayer Material Science), 2.4 parts of triethyl orthoformate and 17.6 parts of butyl acetate. With nitrogen blanketing and stirring, a mixture of 18.2 parts of bis[3-(trimethoxysilyl)propyl]amine (Dynasylan 1124, Degussa, is Rheinfelden) and 8.4 parts of N-[3-(trimethoxysilyl)propyl]butylamine (Dynasylan 1189, Degussa, Rheinfelden) is metered in at a rate such that 50° C. are not exceeded. After the end of the metered addition, the reaction temperature is held at 50° C. for 60 minutes. The degree of blocking is investigated by means of titration (ωNCO=8.3%).

The curing agent has a nonvolatiles fraction of 80% by weight.

Preparation of a Curing Agent (B3) with a Degree of Conversion of the Isocyanate Groups c=30 mol % and 70 mol % of Monosilane Structural Units (I) and 30 mol % of Bissilane Structural Units (II)

A three-neck glass flask equipped with a reflux condenser and a thermometer is charged with 55.4 parts of trimerized hexamethylene diisocyanate (HDI) (Desmodur N3600, Bayer Material Science), 2.4 parts of triethyl orthoformate and 17.6 parts of butyl acetate. With nitrogen blanketing and stirring, a mixture of 9.5 parts of bis[3-(trimethoxysilyl)propyl]amine (Dynasylan 1124, Degussa, Rheinfelden) and 15.2 parts of N-[3-(trimethoxysilyl)propyl]butylamine (Dynasylan 1189, Degussa, Rheinfelden) is metered in at a rate such that 50° C. are not exceeded. After the end of the metered addition, the reaction temperature is held at 50° C. for 60 minutes. The degree of blocking is investigated by means of titration (ωNCO=8.6%).

The curing agent has a nonvolatiles fraction of 80% by weight.

Curing Agent (B4)

Curing agent (B4) used is the commercial trimerized hexamethylene diisocyanate (HDI) (Desmodur N3600, Bayer Material Science).

Preparation of the Coating Compositions of Examples 1 to 4 and of Examples C1 to C8 (Comparative)

From the components specified in table 3, the transparent coating materials of inventive examples 1 to 4 and the transparent coating materials of comparative examples C1 to C8 were prepared by combining the components specified in table 3 and stirring them together until a homogeneous mixture is obtained.

The properties of the coating were tested following pneumatic application of the coating compositions at 2.5 bar in three spray passes over a standard commercial solid-color black aqueous basecoat from BASF Coatings AG. The basecoat had been applied beforehand to standard commercial bonderized steel panels from Chemetall which were coated with a standard commercial, baked electrocoat from BASF Coatings AG and with a standard commercial, baked primer from BASF Coatings AG. Following application, each of the resultant coatings is flashed at room temperature for 5 minutes and then baked at 140° C. for 22 minutes.

The scratch resistance of the surfaces of the resultant coatings was determined by means of the crock meter test (along the lines of EN ISO 105-X12) with 10 back-and-forth strokes and an application force of 9 N, using 9 μm abrasive paper (3M 281Q Wetordry™Production™), with subsequent determination of the residual gloss at 20° using a standard commercial gloss meter.

The Erichsen cupping of the resultant coatings was determined in accordance with DIN EN ISO 1520.

The antistonechip properties were tested in accordance with ISO 20567-1:2007-1 with 2 times 500 g shot material and 2 bar pressure. The damaged area is assessed visually, the rating 0.5 denoting the best value, with the smallest damaged area, and the rating 5.0 denoting the worst value, with the largest damaged area.

TABLE 3

Composition of the coating compositions of inventive examples 1 to 4 and of comparative examples C1 to C8 in parts by weight

| | Example | | | | | | | | | | | |
|---|---|---|---|---|---|---|---|---|---|---|---|---|
| | C1 | C2 | C3 | C4 | 1 | 2 | C5 | C6 | C7 | C8 | 3 | 4 |
| Acrylate A4 (comp.) | 70 | 70 | 70 | | | | | | | | | |
| Acrylate A3 | | | | 70 | 70 | 70 | | | | | | |
| Acrylate A2 (comp.) | | | | | | | 75.8 | 75.8 | 76 | | | |
| Acrylate A1 | | | | | | | | | | 70 | 70 | 70 |
| Butyl acetate | 38.9 | 38.3 | 38 | 38.9 | 38 | 37.7 | 23.0 | 22.7 | 22 | 29 | 28.5 | 28.2 |
| Dynoadd F1 | 0.2 | 0.2 | 0.2 | 0.2 | 0.2 | 0.2 | 0.2 | 0.2 | 0.2 | 0.2 | 0.2 | 0.2 |
| Tinuvin ® 384 | 1.1 | 1.1 | 1.1 | 1.1 | 1.1 | 1.1 | 1.1 | 1.1 | 1.1 | 1.1 | 1.1 | 1.1 |
| Tinuvin ® 292 | 1.0 | 1.0 | 1.0 | 1.0 | 1.0 | 1.0 | 1.0 | 1.0 | 1.0 | 1.0 | 1.0 | 1.0 |
| Nacure ® 4167 | 4.3 | 3.6 | 3.0 | 4.3 | 3.6 | 3.0 | 2.7 | 2.2 | 1.8 | 2.7 | 2.2 | 1.8 |
| Curing agent B1 (comp.) | 74.0 | | | 74.0 | | | 46.9 | | | 47 | | |
| Curing agent B2 | | 71.6 | | | 72 | | | 45.4 | | | 45.4 | |
| Curing agent B3 | | | 69 | | | 69.2 | | | 44 | | | 43.9 |

Key to table 3:
Dynoadd F1 = standard commercial, polyfunctional, surface-active additive from Hertfelder GmbH, Bielefeld
Tinuvin ® 384 = standard commercial light stabilizer based on a benzotriazole, from Ciba
Tinuvin ® 292 = standard commercial light stabilizer based on a sterically hindered amine from Ciba
Nacure ® 4167 = Catalyst based on amine-blocked phosphoric acid partial esters, from King Industries, nonvolatiles fraction 25%

TABLE 4

Properties of the coating components and properties of the resultant coatings of inventive examples 1 to 4 and comparative examples C1 to C8

| | Example | | | | | | | | | | | |
|---|---|---|---|---|---|---|---|---|---|---|---|---|
| | C1 | C2 | C3 | C4 | 1 | 2 | C5 | C6 | C7 | C8 | 3 | 4 |
| Binder | A4 | A4 | A4 | A3 | A3 | A3 | A2 | A2 | A2 | A1 | A1 | A1[5] |
| Tg binder | 29° C. | 29° C. | 29° C. | −27° C. | −27° C. | −27° C. | 53° C. | 53° C. | 53° C. | −6° C. | −6° C. | −6° C. |

TABLE 4-continued

Properties of the coating components and properties of the resultant coatings of inventive examples 1 to 4 and comparative examples C1 to C8

| | Example | | | | | | | | | | | |
|---|---|---|---|---|---|---|---|---|---|---|---|---|
| | C1 | C2 | C3 | C4 | 1 | 2 | C5 | C6 | C7 | C8 | 3 | 4 |
| OH number calc. (mg KOH/g) | 175 | 175 | 175 | 175 | 175 | 175 | 110 | 110 | 110 | 110 | 110 | 110 |
| Curing agent B1 (comparative) | 74.0 | | | 74.0 | | | 46.9 | | | 47 | | |
| Curing agent B2 | | 71.6 | | | 72 | | | 45.4 | | | 45.4 | |
| Curing agent B3 | | | 69 | | | 69.2 | | | 44 | | | 43.9 |
| Monosilane(I):bis-silane(II) (mol %) | 10:90 | 40:60 | 70:30 | 10:90 | 40:60 | 70:30 | 10:90 | 40:60 | 70:30 | 10:90 | 40:60 | 70:30 |
| % by mass Si[1] | 3.4 | 2.9 | 2.3 | 3.4 | 2.9 | 2.3 | 2.7 | 2.3 | 1.9 | 2.7 | 2.3 | 1.9 |
| Erichsen (mm)[2] | 5.4 | 6.6 | 7.4 | 7.1 | 7.5 | 7.8 | 7.1 | 8.1 | 8.1 | 7.9 | 8.5 | 8.6 |
| Residual gloss (%)[3] | 67% | 58% | 53% | 91% | 80% | 73% | 37% | 27% | 18% | 52% | 45% | 40% |
| Stonechip[4] | 2.0 | | | 2.0 | | | 2.0 | | | 1.5 | | |

Key to table 4:
[1] = Theoretically calculated silicon content in % by mass. It is calculated from the raw materials used by subtracting all fo the organic radicals attached to the silicon and including only half of the oxygen atoms on the silicon.
[2] = Erichsen cupping in mm, determined to DIN EN ISO 1520
[3] = Residual gloss by crock meter in %
[4] = Visual assessment of damaged area after stonechip testing Discussion of the Test Results of Table 4:

A comparison of inventive examples 1 and 2 with comparative example C4 shows that, for the same binder and the same degree of silanization (30 mol %), the Erichsen cupping increases as the fraction of monosilane structural units (I) goes up and, correspondingly, the fraction of bissilane structural units (II) goes down. At the same time, admittedly, there is a decrease in scratch resistance, but in example 2 as well, with the best value for Erichsen cupping, the scratch resistance still remains at a very high level, and hence is very good.

The same relationship between scratch resistance and Erichsen cupping and the proportion of the structural units (I) to the structural units (II) also becomes clear when comparing inventive examples 3 and 4 with comparative example C8. Here again, with the same binder and the same degree of silanization, there is an increase in the Erichsen cupping and a decrease in the scratch resistance as the fraction of monosilane structural units (I) goes up, and, correspondingly, the fraction of bissilane structural units (II) goes down.

The same relationship between scratch resistance and Erichsen cupping and the proportion of the structural units (I) to the structural units (II) is also observed, moreover, when comparing comparative examples C1, C2, and C3 and when comparing comparative examples C5, C6, and C7.

It should also be noted here that the scratch resistance of the coating is in fact improved not only by the use of the crosslinkers (B) of the invention but also, surprisingly, through the inventive use of the (meth)acrylate polyols (A) with a glass transition temperature below 10° C. For instance, the comparison of inventive example 1 with comparative example C2 shows that, for the same degree of silanization and the same proportion of 40 mol % monosilane structural units (I) and 60 mol % bissilane structural units (II), and also with the same OH number of the binders, the scratch resistances achieved are significantly higher when using the inventive binders with a glass transition temperature below 10° C., as in inventive example 1, than when using binders having a glass transition temperature of above 10° C., as in comparative example C2. In spite of this increased scratch resistance on the part of the coating of inventive example 1, however, the use of the inventive binders with a glass transition temperature below 10° C. means that this coating also at the same time has an Erichsen cupping which is improved over that of the corresponding comparative example C2.

This is likewise confirmed by the comparison of inventive example 3 with comparative example C6. The comparison of inventive example 3 with comparative example C6 also shows that, with the same degree of silanization and the same proportion of 40 mol % of monosilane structural units (I) and 60 mol % of bissilane structural units (II), and with the same OH number of the binders, the scratch resistances achieved when using the inventive binders with a glass transition temperature below 10° C., as in inventive example 3, are significantly higher than when using binders having a glass transition temperature of above 10° C., as in comparative example C6. In spite of this increased scratch resistance on the part of the coating of inventive example 3, however, this coating also has at the same time an Erichsen cupping which is improved over that of the corresponding comparative example C6.

Correspondingly, moreover, this is also confirmed by the comparison of inventive example 2 with comparative example C3 and through the comparison of inventive example 4 with comparative example C7.

Only through the inventive combination of the binders having a glass transition temperature below 10° C. with the inventive curing agents (B) which are modified with the structural units (I) and (II) is success achieved, in accordance with the invention, in providing coating compositions, and coatings produced from them, that feature not only a high scratch resistance but also, at the same time, good Erichsen cupping and good antistonechip properties.

The testing of the long-term scratch resistance, i.e., the testing of the residual gloss of the coatings after multiply repeated scratch exposure, gave very good results here as well for the coatings produced in accordance with the invention.

Preparation of the Coating Compositions of Comparative Examples C9 to C12

The transparent varnishes of comparative examples C9 to C12 are prepared from the components specified in table 5 by combining the components specified in table 5 and stirring them until a homogeneous mixture is produced. In the same way as for the production of the coatings of inventive examples 1 to 4 and of comparative examples C1 to C8, the coating compositions of comparative examples C9 to C12 are applied and cured and the scratch resistance and antistonechip properties are tested. The results are set out in table 6.

TABLE 5

Composition of the coating compositions of comparative examples C9 to C12 in parts by weight

| | Comp. Ex. C9 | Comp. Ex. C10 | Comp. Ex. C11 | Comp. ex. C12 |
|---|---|---|---|---|
| Acrylate A1 | 70 | | | |
| Acrylate A2 (comp.) | | 75.8 | | |
| Acrylate A3 | | | 70 | |
| Acrylate A4 (comp.) | | | | 70 |
| Butyl acetate | 31.9 | 31.9 | 18.6 | 18.6 |
| Dynoadd F1 | 0.2 | 0.2 | 0.2 | 0.2 |
| Tinuvin 384 | 1.1 | 1.1 | 1.1 | 1.1 |
| Tinuvin 292 | 1.0 | 1.0 | 1.0 | 1.0 |
| Nacure 4167 | 4.3 | 4.3 | 2.7 | 2.7 |
| Curing agent B4 (comp.) | 27.1 | 27.1 | 17.2 | 17.2 |

TABLE 6

Test results of the coatings of comparative examples C9 to C12

| | Comp. ex. C9 | Comp. ex. C10 | Comp. ex. C11 | Comp. ex. C12 |
|---|---|---|---|---|
| Acrylate | A1 | A2 | A3 | A4 |
| Tg (° C.) | −6° C. | 53° C. | −27° C. | 29° C. |
| OHN (mg KOH/g) | 110 | 110 | 175 | 175 |
| Curing agent | B4 | B4 | B4 | B4 |
| % by mass Si[1] | — | — | — | — |
| Crock meter residual gloss (%)[2] | 18% | 0% | 37% | 14% |
| Stonechip[3] | 1.5 | 2.5 | 1.5 | 2.0 |

Key to table 6:
[1] = Theoretically calculated silicon content in % by mass (corresponds to the silicon content expected in the thermogravimetric analysis). It is calculated from the raw materials used by subtracting all of the organic radicals attached to the silicon and including only half of the oxygen atoms on the silicon.
[2] = Residual gloss by crock meter in %
[3] = Visual assessment of damaged area after stonechip testing Discussion of the Test Results of Table 6:

The comparison of comparative example C9 with comparative example C10 here again shows the effect already found in the discussion of the test results of table 4, namely that, with the same crosslinker (B) and the same OH number of the binders, the scratch resistances achieved when using the binders of the invention with a glass transition temperature below 10° C., as in comparative example C9 or C11, are significantly higher than when using binders with a glass transition temperature of more than 10° C., as in comparative example C10 or C12.

At the same time, however, these comparative examples C9 to C12 illustrate the fact that sufficient scratch resistances are not achieved by the selection of the binders alone, but instead that such is achieved only through combination with the crosslinkers (B) of the invention. Finally, however, it was again pointed out that, in the selection of crosslinkers, it is also essential to the invention not only to use crosslinkers with silane groups but also for the crosslinkers to be modified with the inventive mixture of the structural units (I) and (II), since only in this way is it ensured that, in tandem with the good scratch resistance, correspondingly good Erichsen cupping values are achieved as well (cf. Discussion of the test results of table 4).

What is claimed is:
1. A coating composition comprising:
(A) at least one hydroxyl-containing polyacrylate and/or at least one hydroxyl-containing polymethacrylate, and
(B) at least one compound containing isocyanate groups and having at least one structural unit (I) of the formula (I)

—N(X—SiR''$_x$(OR')$_{3-x}$)  (I), 

and having at least one structural unit (II) of the formula (II)

—N(X—SiR''$_x$(OR')$_{3-x}$)$_n$(X'—SiR''$_y$(OR')$_{3-y}$)$_m$  (II), 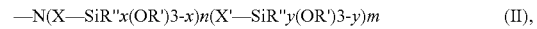

where
R=hydrogen, an alkyl group, an cycloalkyl group, an aryl group, or an aralkyl group, wherein the alkyl group, the cycloalkyl group, the aryl group, and the aralkyl group include a carbon chain that is interruptible by nonadjacent oxygen, sulfur, or NRa groups, with Ra=an alkyl group, a cycloalkyl group, an aryl group, or an aralkyl group,
R'=hydrogen, an alkyl group, or a cycloalkyl group, wherein the alkyl group and the cycloaklyl group include a carbon chain interruptible by nonadjacent oxygen, sulfur, or NRa groups, with Ra=an alkyl group, an cycloalkyl group, an aryl group, or an aralkyl group,
X, X'=a linear and/or branched alkylene or cycloalkylene radical having from 1 carbon atom to 20 carbon atoms,
R''=an alkyl group, a cycloalkyl group, an aryl group, or an aralkyl group, wherein the alkyl group, the cycloalkyl group, the aryl group, and the aralkyl group include a carbon chain interruptible by nonadjacent oxygen, sulfur, or NRa groups, with Ra=an alkyl group, a cycloalkyl group, an aryl group, or an aralkyl group,
n=0 to 2,
m=0 to 2,
m+n=2,
x=0 to 2, and
y=0 to 2,
wherein
(i) the at least one hydroxyl-containing polyacrylate (A) and/or at least one hydroxyl-containing polymethacrylate have/has a glass transition temperature of less than 10° C.,
(ii) the at least one compound (B) containing isocyanate groups contains from more than 10 mol % to 90 mol % of the at least one structural unit (I) and from 10 mol % to less than 90 mol % of the at least one structural unit (II), based on an entirety of the structural units (I) and (II), and
(iii) from 10 mol % to 60 mol % of the isocyanate groups of the at least one compound (B) containing isocyanate groups have been reacted to form the structural units (I) and (II).
2. The coating composition as claimed in claim 1, wherein
R'=an ethyl group and/or a methyl group, and/or
X, X'=an alkylene radical having from 1 carbon atom to 4 carbon atoms, and/or
R''=an alkyl radical.
3. The coating composition as claimed in claim 1, wherein R''=an alkyl radical having from 1 carbon atom to 6 carbon atoms.
4. The coating composition as claimed in claim 1, wherein the at least one hydroxyl-containing polyacrylate (A) and/or at least one hydroxyl-containing polymethacrylate have/has a glass transition temperature, Tg, of from −60° C. to 5° C.

5. The coating composition as claimed in claim 1, wherein the at least one hydroxyl-containing polyacrylate (A) and/or at least one hydroxyl-containing polymethacrylate have/has a glass transition temperature, Tg, of from −30° C. to less than 0° C.

6. The coating composition as claimed in claim 1, wherein the at least one compound (B) containing isocyanate groups contains from 20 mol % to 80 mol % of the at least one structural unit (I) and from 20 mol % to 80 mol % of at least one structural unit (II), based on the entirety of the structural units (I) and (II).

7. The coating composition as claimed in claim 1, wherein the at least one compound (B) containing isocyanate groups contains from 30 mol % to 70 mol % of the at least one structural unit (I) and from 30 mol % to 70 mol % of the at least one structural unit (II), based on the entirety of the structural units (I) and (II).

8. The coating composition as claimed in claim 1, wherein the coating composition has a calculated silicon content of 1.5% by mass Si to 6.0% by mass Si based on a solids content of the coating composition.

9. The coating composition as claimed in claim 1, wherein the compound (B) containing isocyanate groups has a parent structure formed from a diisocyanate and/or a polyisocyanate having a glass transition temperature of less than or equal to 0° C.

10. The coating composition as claimed in claim 9, wherein the diisocyanate and/or the polyisocyanate are/is 1,6-hexamethylene diisocyanate and/or the isocyanurate trimers thereof and/or the allophanate dimers thereof.

11. The coating composition as claimed in claim 1, wherein the at least one compound (B) containing isocyanate groups has been prepared by reacting diisocyanates and/or polyisocyanates with at least one compound of the formula (Ia)

H—NR—(X—SiR"x(OR')3-x)    (Ia)

and with at least one compound of the formula (IIa)

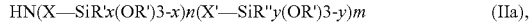

HN(X—SiR'x(OR')3-x)n(X'—SiR"y(OR')3-y)m    (IIa), where
R=hydrogen, an alkyl group, a cycloalkyl group, an aryl group, or an aralkyl group, wherein the alkyl group, the cycloalkyl group, the aryl group, and the aralkyl group include a carbon chain interruptible by nonadjacent oxygen, sulfur, or NRa groups, with Ra=an alkyl group, a cycloalkyl group, an aryl group, or an aralkyl group,
R'=hydrogen, an alkyl group, or a cycloalkyl group, wherein the alkyl group and the cycloalkyl group include a carbon chain interruptible by nonadjacent oxygen, sulfur, or NRa groups, with Ra=an alkyl group, a cycloalkyl group, an aryl group, or an aralkyl group,
X, X'=a linear and/or branched alkylene or cycloalkylene radical having from 1 carbon atom to 20 carbon atoms,
R"=an alkyl group, a cycloalkyl group, an aryl group, or an aralkyl group, wherein the alkyl group, the cycloalkyl group, the aryl group, and the aralkyl group include a carbon chain interruptible by nonadjacent oxygen, sulfur, or NRa groups, with Ra=an alkyl group, a cycloalkyl group, an aryl group, or an aralkyl group,
n=0 to 2
m=0 to 2,
m+n=2,
x=0 to 2, and
y=0 to 2.

12. The coating composition as claimed in claim 1, wherein the at least one hydroxyl-containing polyacrylate (A) and/or at least one hydroxyl-containing polymethacrylate is present in the coating composition in an amount of from 20% by weight to 80% by weight based on a solids content of the coating composition.

13. The coating composition as claimed in claim 1, wherein the at least one hydroxyl-containing polyacrylate (A) and/or at least one hydroxyl-containing polymethacrylate is obtained by copolymerizing:
(a) from 10% by weight to 80% by weight of a hydroxyl-containing ester of acrylic acid or a mixture thereof,
(b) from 0% by weight to 30% by weight of a hydroxyl-containing ester of methacrylic acid other than (a) or a mixture thereof,
(c) from 5% by weight to 90% by weight of an aliphatic or cycloaliphatic ester of (meth)acrylic acid other than (a) and (b) having at least 4 carbon atoms in an alcohol residue or a mixture thereof,
(d) from 0% by weight to 5% by weight of an ethylenically unsaturated carboxylic acid or a mixture thereof,
(e) from 0% by weight to 50% by weight of a vinylaromatic or a mixture thereof, and
(f) from 0% by weight to 50% by weight of an ethylenically unsaturated monomer other than (a), (b), (c), (d), and (e) or a mixture thereof,
wherein a sum of the weight fractions of components (a), (b), (c), (d), (e) and (f) is 100% by weight.

14. The coating composition as claimed in claim 1, further comprising at least one catalyst formed from phosphorus and nitrogen.

15. The coating composition as claimed in claim 1, wherein the at least one hydroxyl-containing polyacrylate (A) and/or at least one hydroxyl-containing polymethacrylate has a glass transition temperature, Tg, of from −27° C. to −6° C.

16. The coating composition as claimed in claim 1, wherein the at least one compound (B) containing isocyanate groups comprises at least one water scavenger formed from an orthoformic acid trialkyl ester.

17. A multicoat color and/or effect paint system comprising:
at least one pigmented basecoat, and
at least one clearcoat disposed on the at least one pigmented basecoat and formed from a coating composition as claimed in claim 1.

18. A multistage coating process, comprising:
applying a pigmented basecoat to an uncoated or precoated substrate, and after applying the pigmented basecoat, applying the coating composition as claimed in claim 1 to the pigmented basecoat.

19. The multistage coating process as claimed in claim 18, further comprising:
after applying the pigmented basecoat, first drying the pigmented basecoat at a temperature of from room temperature to 80° C., and
after applying the coating composition, curing the coating composition at a temperature of from 30° C. to 200° C. for a time of from one minute to 10 hours.

20. The multistage coating process as claimed in claim 18, wherein the multistage coating process is carried out in automotive OEM finishing, finishing of surface-mounted automotive components, or automotive refinishing.

* * * * *